US 12,422,785 B2

(12) United States Patent
Song

(10) Patent No.: US 12,422,785 B2
(45) Date of Patent: Sep. 23, 2025

(54) WEARABLE DEVICE AND CONTROL METHOD THEREFOR

(71) Applicant: VIVO MOBILE COMMUNICATION CO., LTD., Dongguan (CN)

(72) Inventor: Xiangqun Song, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 421 days.

(21) Appl. No.: 17/939,929

(22) Filed: Sep. 7, 2022

(65) Prior Publication Data

US 2023/0004127 A1 Jan. 5, 2023

Related U.S. Application Data

(63) Continuation of application No. PCT/CN2021/079273, filed on Mar. 5, 2021.

(30) Foreign Application Priority Data

Mar. 10, 2020 (CN) .......................... 202010160352.9

(51) Int. Cl.
*G04G 17/02* (2006.01)
*G04G 17/08* (2006.01)
(Continued)

(52) U.S. Cl.
CPC .............. *G04G 17/02* (2013.01); *G04G 17/08* (2013.01); *G04G 21/00* (2013.01); *G06F 1/163* (2013.01); *G06F 3/0202* (2013.01)

(58) Field of Classification Search
CPC ....................................................... G06F 1/163
See application file for complete search history.

(56) References Cited

U.S. PATENT DOCUMENTS

2002/0101457 A1  8/2002 Lang
2006/0158966 A1  7/2006 Maire
(Continued)

FOREIGN PATENT DOCUMENTS

CH         707956 A2 * 10/2014 ............. G04G 21/08
CN       105353831 A      2/2016
(Continued)

OTHER PUBLICATIONS

Translation of CH707956, Espacenet (Year: 2014).*
(Continued)

*Primary Examiner* — Renee S Luebke
*Assistant Examiner* — Matthew Daniel Hwang
(74) *Attorney, Agent, or Firm* — IPX PLLC

(57) ABSTRACT

A wearable device and a control method are provided. The wearable device includes: a rotary disk, a housing, a position detecting unit, and a processor. The rotary disk is rotatably connected to the housing. The position detecting unit is disposed between the rotary disk and the housing. The position detecting unit is electrically connected to the processor. The position detecting unit is configured to detect a target position to which the rotary disk is rotated along the housing and to send the target position to the processor. The processor is configured to enable a shortcut function corresponding to the target position. Multiple positions on the housing correspond to multiple shortcut functions. The target position is one of the multiple positions.

13 Claims, 3 Drawing Sheets

(51) Int. Cl.
*G04G 21/00* (2010.01)
*G06F 1/16* (2006.01)
*G06F 3/02* (2006.01)

(56) References Cited

U.S. PATENT DOCUMENTS

| | | | |
|---|---|---|---|
| 2017/0220137 A1 | 8/2017 | Han | |
| 2017/0371431 A1 | 12/2017 | Kim et al. | |
| 2018/0307333 A1 | 10/2018 | Lim et al. | |
| 2018/0348822 A1* | 12/2018 | Hiraide | G06F 3/0393 |

FOREIGN PATENT DOCUMENTS

| CN | 107111342 A | 8/2017 | |
|---|---|---|---|
| CN | 107203261 A | 9/2017 | |
| CN | 109189317 A | 1/2019 | |
| CN | 209784849 U | 12/2019 | |
| CN | 111381484 A | 7/2020 | |
| EP | 2998799 A1 * | 3/2016 | G04B 1/20 |
| KR | 20160083690 A | 7/2016 | |
| KR | 20160095887 A | 8/2016 | |
| KR | 20170111096 A | 10/2017 | |
| WO | 2014200766 A | 12/2014 | |

OTHER PUBLICATIONS

Translation of EP2998799, Espacenet (Year: 2016).*
International Search Report issued in corresponding International Application No. PCT/CN2021/079273, mailed May 26, 2021, 6 pages.
First Office Action issued in related Chinese Application No. 202010160352.9, mailed Jan. 22, 2021, 30 pages.
Second Office Action issued in related Chinese Application No. 202010160352.9, mailed Jun. 16, 2021, 7 pages.
Extended European Search Report issued in related European Application No. 21767644.4, mailed Jul. 25, 2023, 7 pages.
Examination report issued in related Indian Application No. 202227056119, mailed Jan. 12, 2023, 7 pages.
Office Action issued in related Korean Application No. 10-2022-7033679, mailed Apr. 8, 2024, 6 pages.
Hearing Notice issued in related Indian Application No. 202227056119, mailed Mar. 15, 2024, 3 pages.

* cited by examiner

WEARABLE DEVICE AND CONTROL METHOD THEREFOR

CROSS-REFERENCE TO RELATED APPLICATIONS

This application is a continuation of International Application No. PCT/CN2021/079273, filed on Mar. 5, 2021, which claims priority to Chinese Patent Application No. 202010160352.9, filed on Mar. 10, 2020. The entire contents of each of the above-referenced applications are expressly incorporated herein by reference.

TECHNICAL FIELD

Embodiments of this application relate to the technical field of electronic devices, and in particular to a wearable device and a control method therefor.

BACKGROUND

As the living standard of users is improved, an increasing number of users carry wearable devices (such as smart watches). The wearable devices are deeply loved by the users due to their diversified features. Major manufacturers are constantly introducing wearable devices with different functions or styles for the users to choose. Basically, different types of wearable devices can be provided for different consumer groups.

Although the current wearable devices have multiple functions and are diversified, screens of the wearable devices are designed to be small, and many operation functions need to be operated on the screens. Therefore, it is difficult for the elderly and children or consumers who are not skilled in systems or have bad eyesight to perform operations on the screens.

Multiple operation functions are implemented on some wearable devices by setting of multiple shortcut buttons, but excessive shortcut buttons may lead to design complexity, and also cause a wearable device to become larger, complicated, and not simple entirely, which affects the appearance of the wearable device.

SUMMARY

The embodiments of this application are implemented as follows:

According to a first aspect, a wearable device is provided, including: a rotary disk, a housing, a position detecting unit, and a processor, where the rotary disk is rotatably connected to the housing, the position detecting unit is disposed between the rotary disk and the housing, the position detecting unit is electrically connected to the processor, the position detecting unit is configured to detect a target position to which the rotary disk is rotated along the housing and to send the target position to the processor; and the processor is configured to enable a shortcut function corresponding to the target position, where multiple positions on the housing correspond to multiple shortcut functions, and the target position is one of the multiple positions.

According to a second aspect, a control method is provided, applied to the wearable device according to the first aspect, and including: detecting a target position to which the rotary disk is rotated along the housing; and enabling a shortcut function corresponding to the target position.

The wearable device provided in an embodiment of this application includes the rotary disk, the housing, the position detecting unit, and the processor, the rotary disk is rotatably connected to the housing, and multiple positions on the housing correspond to multiple shortcut functions. This way, the position detecting unit is configured to detect the target position to which the rotary disk is rotated along the housing, and the processor can enable, based on the target position to which the rotary disk is rotated along the housing, a shortcut function corresponding to the target position. In this embodiment of this application, shortcut operations for some functions of the wearable device can be implemented through the rotary disk and a preset corresponding program, and some shortcut buttons can be canceled, so that the wearable device has simple design, brief and elegant appearance, and can be operated easily and practically.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
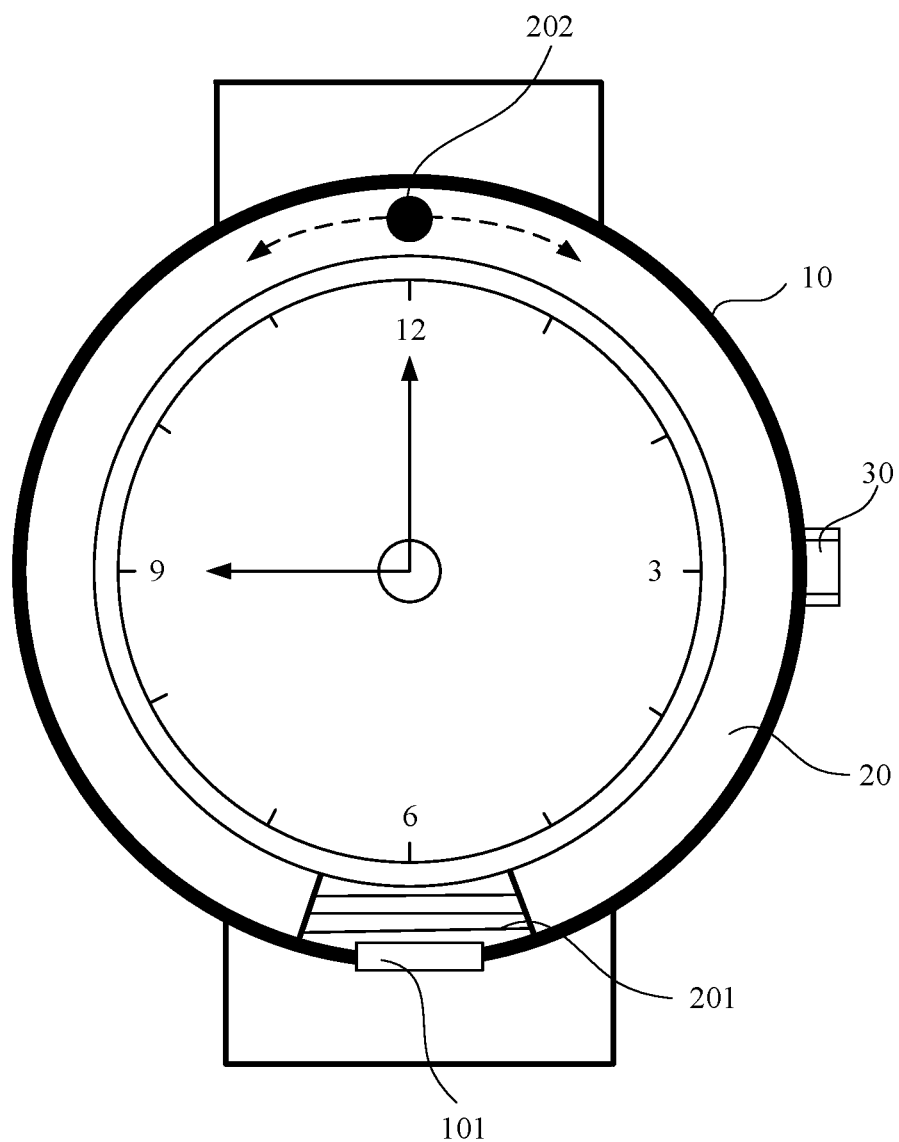
FIG. 1 is a schematic diagram of a wearable device according to an embodiment of this application.

As shown in FIG. 1, an embodiment of this application provides a wearable device, which may be a smart watch. The wearable device mainly includes: a housing 10, a rotary disk 20, a position detecting unit (not shown), a processor (not shown), and a knob 30. Structures and a connection relationship of main components of the wearable device will be introduced below.

The rotary disk 20 may be a cover body having a roughly circular shape entirely, which covers an upper surface of the housing 10. The rotary disk 20 is rotatably connected the housing 10. In an example, a connecting shaft is disposed at a center of the housing 10 and the rotary disk 20, so that the rotary disk 20 is rotatably connected to the housing 10. In another example, an accommodating groove is disposed on the housing 10, and an edge of the rotary disk 20 is located in the accommodating groove, so that the rotary disk 20 is rotatably connected to the housing 10.

In an embodiment shown in FIG. 1, a first returning body 201 is disposed at the rotary disk 20, and a second returning body 101 is disposed on the housing 10. The first returning body 201 and the second returning body 101 are configured to enable the rotary disk 20 to be rotated for returning to an original position, that is, enable the rotary disk 20 to be returned to an initial position shown in FIG. 1.

In an example, the first returning body 201 is a magnet, the second returning body 101 is also a magnet, and magnetic poles of the first returning body 201 are opposite to those of the second returning body 101, so that an attractive force can be generated between the first returning body 201 and the second returning body 101. The attractive force is used for the rotary disk 20 to be returned to the original position.

Figure 2:
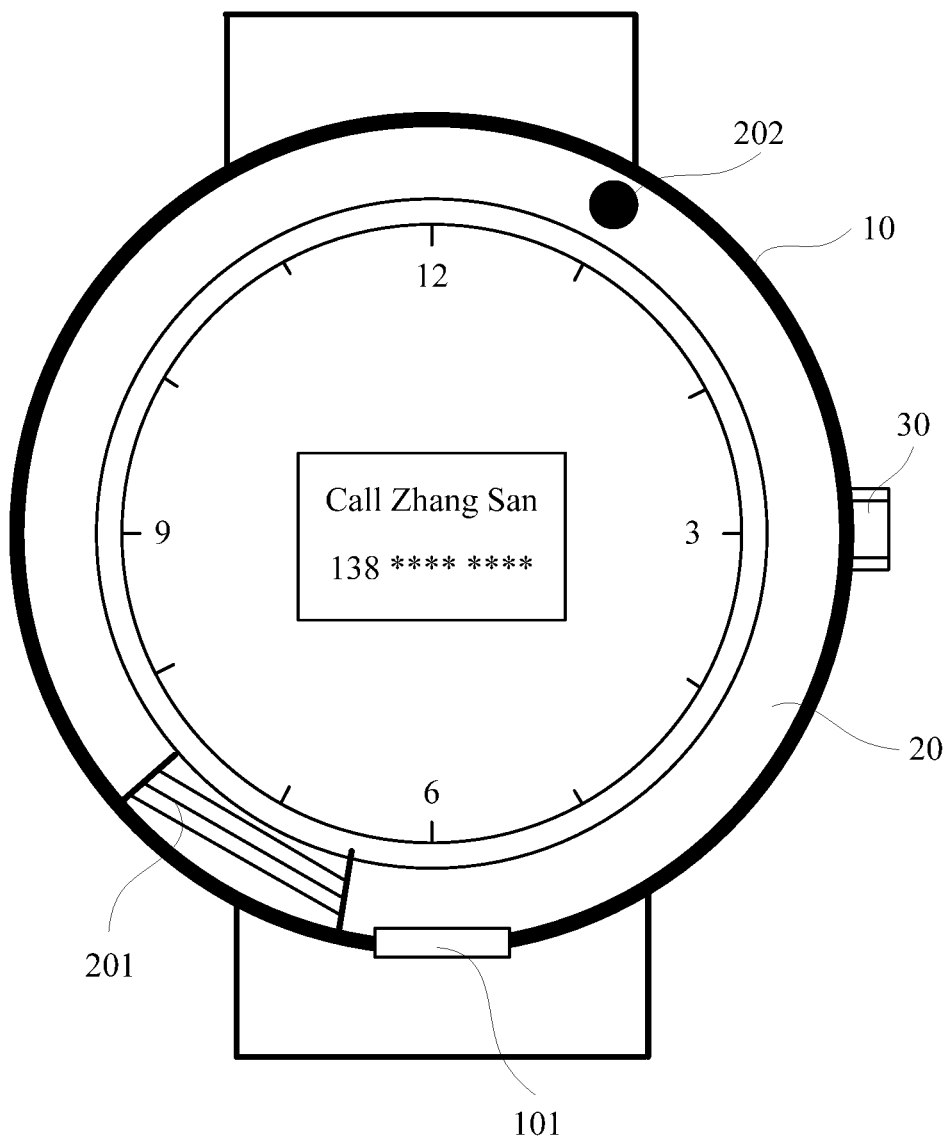
FIG. 2 is another schematic diagram of the wearable device according to an embodiment of this application.

In an embodiment shown in FIG. 1, an indicator 202 is disposed at the rotary disk 20, and the indicator 202 is configured to indicate to a user a position to which the rotary disk 20 is rotated along the housing 10. Referring to FIG. 2, in FIG. 2, the rotary disk 20 is rotated clockwise to the right, so as to be rotated to a 1 o'clock position of the housing 10.

The indicator 202 may be a luminous bump, so that the user can check, in a case of insufficient light, a position to which the rotary disk 20 is rotated along the housing 10.

Figure 3:
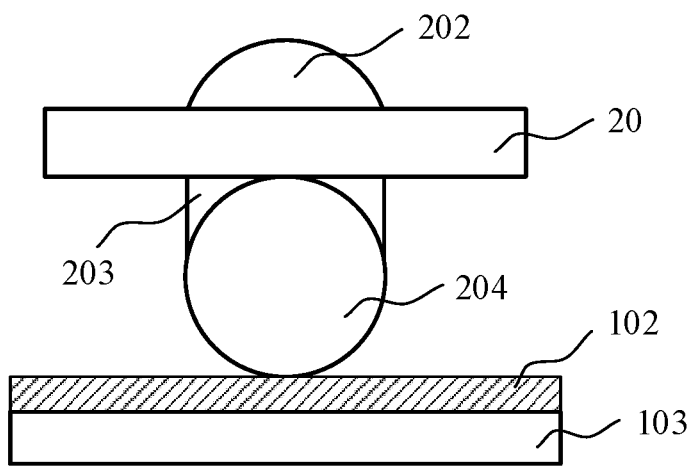
FIG. 3 is a schematic diagram of a connection position between a housing and a rotary disk in the wearable device according to an embodiment of this application.

As shown in FIG. 3, FIG. 3 shows a schematic diagram of a connection relationship between the housing 10 and the rotary disk 20. In this embodiment, a position detecting unit includes a rolling body 204 and a pressure-sensitive composite layer 102. The rolling body 204 may be spherical, is disposed between the rotary disk 20 and the housing 10, and is connected to the rotary disk 20 and the housing 10 in a rolling manner. In addition, the pressure-sensitive composite layer 102 is disposed on a rolling track of the rolling body 204, the pressure-sensitive composite layer 102 may be electrically connected to a processor, and the rolling track of the rolling body 204 may be a circular ring.

It can be further seen from FIG. 3 that a limiting disk 203 is also disposed on the rotary disk 20, the limiting disk 203 is fixedly connected to a body of the rotary disk, and a position of the limiting disk 203 corresponds to a position of the indicator 202. For example, as shown in FIG. 3, the indicator 202 is disposed at an upper surface of the rotary disk 20, the limiting disk 203 is disposed at a lower surface of the rotary disk 20, and the indicator 202 and the limiting disk 203 are disposed to be opposite to each other at a same position of the rotary disk 20.

It can be seen from FIG. 3 that the limiting disk 203 includes a roughly bowl-shaped accommodating cavity, the rolling body 204 is accommodated in the accommodating cavity of the limiting disk 203, and the rolling body 204 is rotatably connected to the rotary disk 20 in the limiting disk 203.

It can be seen from FIG. 3 that the pressure-sensitive composite layer 102 is disposed on the rolling track of the rolling body 204, and a lower part of the pressure-sensitive composite layer 102 is a base 103 of the housing 10. This way, through the rolling body 204 and the pressure-sensitive composite layer 102, a position to which the rotary disk 20 is rotated along the housing 10 can be detected in real time, and the position (information) can be sent to the processor.

Figure 4:
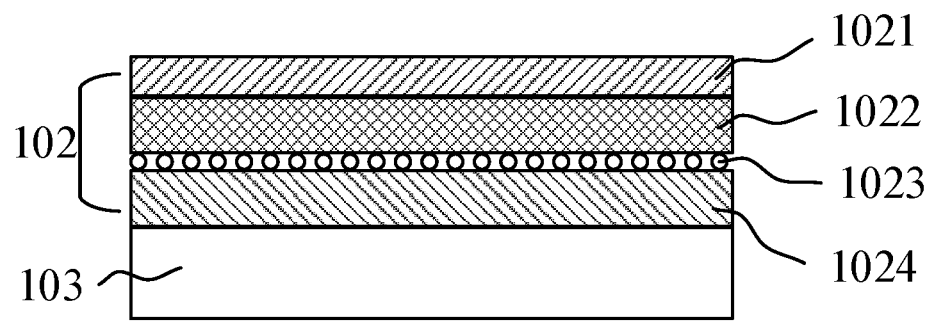
FIG. 4 is a schematic structural diagram of a pressure-sensitive composite layer in the wearable device according to an embodiment of this application.

For the pressure-sensitive composite layer 102, in an example, as shown in FIG. 4, the pressure-sensitive composite layer 102 sequentially includes from top to bottom: a non-slip plastic layer 1021; an oxidized metal conductive layer 1022 contacting the non-slip plastic layer 1021; an isolating particulate matter layer 1023 contacting the oxidized metal conductive layer 1022, and a conductive coating 1024 contacting the isolating particulate matter layer 1023.

In this embodiment of this present application, multiple positions on the housing 10 correspond to multiple shortcut functions. In an example, each integer number represents a shortcut function. For example, the rotary disk 20 is rotated clockwise to the right (that is, rotated relative to the housing 10, and the rest is similar) to enable a calling function, 1 represents calling Zhang San, 2 represents calling Li Si . . . ; and the rotary disk 20 is rotated counterclockwise to the left to enable other shortcut functions except the calling function, for example, 11 represents enabling music, and 10 represents enabling positioning . . . .

Through the foregoing settings, the processor disposed in the wearable device can detect a target position to which the rotary disk 20 is rotated along the housing 10, and enable a shortcut function corresponding to the target position based on the target position.

In some embodiments, the wearable device introduced in each of the foregoing embodiments further includes a display unit (not numbered) electrically connected to the processor, and the display unit is configured to show (or display) prompt information corresponding to the target position. As shown in FIG. 2, the prompt information displayed by the display unit includes: "Call Zhang San" and a telephone number corresponding to Zhang San.

The wearable device provided in an embodiment of this application includes the rotary disk, the housing, the position detecting unit, and the processor, the rotary disk is rotatably connected to the housing, and multiple positions on the housing correspond to multiple shortcut functions. This way, the position detecting unit is configured to detect the target position to which the rotary disk is rotated along the housing, and the processor can enable, based on the target position to which the rotary disk is rotated along the housing, a shortcut function corresponding to the target position.

In this embodiment of this application, shortcut operations for some functions of the wearable device can be implemented through the rotary disk and a preset corresponding program, and some shortcut buttons can be canceled, so that the wearable device has simple design, brief and elegant appearance, and can be operated easily and practically.

The foregoing embodiments mainly introduce a main structure of the wearable device, and a working principle thereof will be introduced below.

A structure of the pressure-sensitive composite layer 102 disposed on the housing 10 is shown in FIG. 4, which may be a resistance-type touch screen. A pressure of the rolling body 204 (including gravity of the rolling body 204 and a pressing force of a user's finger) enables a part of the pressure-sensitive composite layer 102 to deform. Therefore, conductive layers on a top/bottom of the isolating particulate matter layer 1023 are connected, a resistance value is changed, and a corresponding electrical signal is transmitted through a sensor and sent to the processor through a conversion circuit. Then, the processor can determine a position to which the rotary disk 20 is rotated along the housing 10.

Multiple shortcut functions are preset in the wearable device provided in the embodiment of this application. For example, when the rotary disk is rotated clockwise to the right, a function of quick dial is enabled, and when the rotary disk is rotated counterclockwise to the left, functions such as music and positioning are enabled.

For example, the function of the quick dial is enabled if the rotary disk 20 is rotated clockwise to the right. A name, photo, or phone number of a contact person indicated by 1, 2, or 3 . . . in the system can be stored in turn. Other shortcut functions are enabled if the rotary disk 20 is rotated to the left. Each integer number represents one function, for example, 11 represents enabling music, 10 represents enabling positioning, 9 represents enabling another function . . . .

When the user needs to implement a shortcut function (or a shortcut operation), the user can press the rotary disk 20 with a finger to rotate the rotary disk to a specific direction. During rotation, the rolling body 204 (such as a ball) under the rotary disk 20 will roll on the pressure-sensitive composite layer 102, the processor of the wearable device determines a position of the rolling body 204 according to a signal generated by the rolling body 204, converts information about the position into a corresponding value, and determines, according to a range of the value, a shortcut operation that the user desires.

For example, the user rotates the rotary disk 20 clockwise to the right, and detects that a position of the rolling body 204 is between 0.5 and 1.5, then the system recommends 1 by default, and the system displays at least one of a portrait, name, or phone number of a contact person indicated by 1. In addition, the user can determine whether a position of the indicator 202 is a serial number stored for a frequent contact person. If yes, this image will be kept for a certain time, that is, the rotary disk 20 stays at the position for a certain time, and the system automatically dials a telephone number of the frequent contact person.

After the shortcut function is enabled, the user can release the rotary disk 20 with a finger and swing a wrist (to make an action that enables a 12 o'clock position in the rotary disk 20 to be in a vertical downward status), the rotary disk 20 will be returned to an original position due to local mass and a principle of using different magnetic poles to attract each other (the first returning body 201 contains a weak S pole, and the second returning body 101 contains a weak N pole). Mass of the rolling body 204 may be slightly larger than mass of the rotary disk 20 that is partially thickened, so that during swinging, the rolling body 204 can be quickly returned to the original position under the action of gravity, that is, the position shown in FIG. 1. The rotary disk 20 that is partially thickened is the rotary disk 20 on which the first returning body 201 with an additional thickness and mass is disposed.

When the wearable device provided according to an embodiment of this application is operated at night, the indicator 202 may be, for example, a luminous bump, may shine to a certain extent to facilitate nighttime operation by the user.

Embodiments of this application can implement quick operations for some functions of the wearable device, especially the dialing function, which is very convenient and practical for the elderly and children to operate the wearable device by using the quick dial function due to relatively small watch screens.

Figure 5:
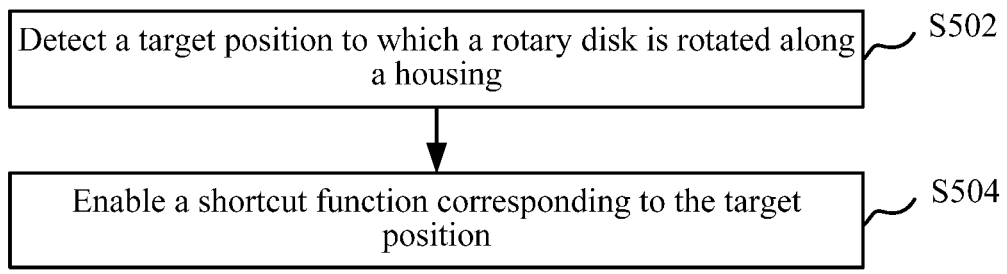
FIG. 5 is a schematic flowchart of a control method according to an embodiment of this application.

The wearable device according to the embodiments of this application has been described in detail above with reference to FIG. 1 to FIG. 4. A control method according to another embodiment of this application will be described in detail below with reference to FIG. 5. The control method can be applied to the wearable device described in any of the foregoing embodiments. As shown in FIG. 5, this embodiment includes the following steps.

S502: Detect a target position to which the rotary disk is rotated along the housing.

S504: Enable a shortcut function corresponding to the target position.

This embodiment of this application can achieve the same or equivalent technical effects as the foregoing embodiments, and to avoid repetition, corresponding descriptions are omitted properly.

In some embodiments, as an embodiment, the foregoing enabling a shortcut function corresponding to the target position includes: displaying prompt information corresponding to the target position. For example, as shown in FIG. 2, the prompt information includes an identity of a called person, Zhang San, and a phone number of the called person; and in a case that duration for which the rotary disk stays at the target position reaches preset duration, a shortcut function corresponding to the target position is enabled, for example, a shortcut function of calling Zhang San is enabled in FIG. 2.

In this embodiment, through the foregoing displayed prompt information and the operation of enabling the shortcut function after preset duration, a user's misoperation can be prevented (for example, if the rotary disk is returned after the rotary disk is rotated mistakenly, no corresponding shortcut function will be enabled), which can improve user experience.

The embodiments in this specification are described in a progressive manner. Each embodiment usually focuses on a difference from other embodiments. For a same or similar part of the embodiments, please refer to each other. A method embodiment is described simply because the method embodiment is similar to the embodiment of the wearable device. For related details, please refer to some description of the embodiment of the wearable device.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A wearable device, comprising:
a rotary disk; a housing; a position detecting unit; and a processor,
wherein:
the rotary disk is rotatably connected to the housing,
an indicator is disposed at the rotary disk, and the indicator is configured to indicate a position to which the rotary disk is rotated along the housing,
the position detecting unit is disposed between the rotary disk and the housing,
the position detecting unit comprises a rolling body connected to the rotary disk and the housing in a rolling manner,
the housing comprises a pressure-sensitive composite layer on a rolling track of the rolling body,
the position detecting unit is electrically connected to the processor,
the position detecting unit is configured to detect a target position to which the rotary disk is rotated along the housing and to send the target position to the processor, and
the processor is configured to enable a shortcut function corresponding to the target position, wherein multiple positions on the housing correspond to multiple shortcut functions, and the target position is one of the multiple positions.

2. The wearable device according to claim 1, wherein a limiting disk is disposed at a position at which the rotary disk is opposite to the indicator, and the rolling body is accommodated in the limiting disk.

3. The wearable device according to claim 1, wherein the pressure-sensitive composite layer comprises:
a non-slip plastic layer;
an oxidized metal conductive layer contacting the non-slip plastic layer;
an isolating particulate matter layer contacting the oxidized metal conductive layer; and
a conductive coating contacting the isolating particulate matter layer.

4. The wearable device according to claim 1,
wherein:
a first returning body is disposed at the rotary disk,
a second returning body is disposed on the housing, and
the first returning body and the second returning body are two magnets with opposite magnetic poles.

5. The wearable device according to claim 1, wherein the multiple shortcut functions comprise at least two of the following:
dialing; positioning; or playing music.

6. The wearable device according to claim 1, further comprising: a display unit electrically connected to the processor, wherein the display unit is configured to display prompt information corresponding to the target position.

7. A control method, performed by a wearable device comprising:
a rotary disk, a housing, a position detecting unit, and a processor,
wherein:
the rotary disk is rotatably connected to the housing,
an indicator is disposed at the rotary disk, and the indicator is configured to indicate a position to which the rotary disk is rotated along the housing,
the position detecting unit is disposed between the rotary disk and the housing,
the position detecting unit comprises a rolling body connected to the rotary disk and the housing in a rolling manner,
the housing comprises a pressure-sensitive composite layer on a rolling track of the rolling body,
the position detecting unit is electrically connected to the processor,
the position detecting unit is configured to detect a target position to which the rotary disk is rotated along the housing and to send the target position to the processor, and
the processor is configured to enable a shortcut function corresponding to the target position, wherein multiple positions on the housing correspond to multiple shortcut functions, and the target position is one of the multiple positions, comprising:
detecting a target position to which the rotary disk is rotated along the housing; and
enabling a shortcut function corresponding to the target position.

8. The control method according to claim 7, wherein a limiting disk is disposed at a position at which the rotary disk is opposite to the indicator, and the rolling body is accommodated in the limiting disk.

9. The control method according to claim 7, wherein the pressure-sensitive composite layer comprises:
a non-slip plastic layer;
an oxidized metal conductive layer contacting the non-slip plastic layer;
an isolating particulate matter layer contacting the oxidized metal conductive layer; and
a conductive coating contacting the isolating particulate matter layer.

10. The control method according to claim 7,
wherein:
a first returning body is disposed at the rotary disk,
a second returning body is disposed on the housing, and
the first returning body and the second returning body are two magnets with opposite magnetic poles.

11. The control method according to claim 7, wherein the multiple shortcut functions comprise at least two of the following:
dialing; positioning; or playing music.

12. The control method according to claim 7, wherein the wearable device further comprises a display unit electrically connected to the processor, wherein the display unit is configured to display prompt information corresponding to the target position.

13. The control method according to claim 7, wherein the enabling a shortcut function corresponding to the target position comprises:
displaying prompt information corresponding to the target position; and
enabling, when a duration for which the rotary disk stays at the target position reaches a preset duration, the shortcut function corresponding to the target position.

* * * * *